US005734566A

United States Patent [19]
Stengl

[11] Patent Number: 5,734,566
[45] Date of Patent: Mar. 31, 1998

[54] METHOD AND APPARATUS FOR KEEPING A MATCHED DOCUMENT INSERTER SYSTEM IN SYNCHRONIZATION

[75] Inventor: Richard F. Stengl, Wolcott, Conn.

[73] Assignee: Pitney Bowes Inc., Stamford, Conn.

[21] Appl. No.: 519,873

[22] Filed: Aug. 25, 1995

[51] Int. Cl.[6] .......... B65H 39/00; G06F 19/00; G05B 15/00

[52] U.S. Cl. .......... 364/138; 270/52.04; 270/52.05; 364/478.07; 364/478.1; 705/410

[58] Field of Search .......... 270/52.02, 52.04, 270/52.05, 58.26; 364/138, 148, 464.16, 464.2, 478.03, 478.07, 478.08, 478.09, 478.1, 478.11, 478.12

[56] References Cited

U.S. PATENT DOCUMENTS

| | | | |
|---|---|---|---|
| 3,484,100 | 12/1969 | Sather et al. | 270/52.02 |
| 3,904,946 | 9/1975 | Dlugos et al. | 318/685 |
| 4,516,209 | 5/1985 | Scribner | 364/464.16 |
| 4,527,468 | 7/1985 | Piotroski | 101/2 |
| 4,527,790 | 7/1985 | Piotroski | 270/58 |
| 4,547,856 | 10/1985 | Piotroski et al. | 364/478 |
| 4,571,925 | 2/1986 | Adams | 53/502 |
| 4,639,873 | 1/1987 | Baggarly et al. | 364/464.16 |
| 4,733,359 | 3/1988 | Luperti et al. | 364/478 |
| 4,734,865 | 3/1988 | Scullion et al. | 364/478.1 |
| 4,797,830 | 1/1989 | Baggarly et al. | 364/464.16 |
| 4,807,111 | 2/1989 | Cohen et al. | 395/250 |
| 4,817,042 | 3/1989 | Pintsov | 364/478 |
| 4,829,443 | 5/1989 | Pintsov et al. | 364/478 X |
| 5,127,640 | 7/1992 | Orsinger et al. | 270/52.04 |
| 5,177,687 | 1/1993 | Baggarly et al. | 364/464.16 |
| 5,367,450 | 11/1994 | Pintsov | 364/401 |
| 5,413,212 | 5/1995 | Bodie | 198/718 |
| 5,419,541 | 5/1995 | Stevens | 270/52.19 |
| 5,659,481 | 8/1997 | Qutub et al. | 364/478.08 |

*Primary Examiner*—Edward R. Cosimano
*Attorney, Agent, or Firm*—Angelo N. Chaclas; Charles R. Malandra, Jr.; Melvin J. Scolnick

[57] ABSTRACT

A method and apparatus for keeping a matched document inserter system in synchronization. The method and apparatus are directed to controlling the inserter system which includes an input section for producing a sequence of collations, a transport for feeding the sequence of collations in a path of travel and a chassis section downstream from the input section capable of combining each collation in the sequence of collations with a respective corresponding specific enclosure. The method comprises the step(s) of: (a) recognizing when a collation in the sequence of collations has been removed from the inserter system, and (b) after the removed collation has been eliminated from the sequence of collations, maintaining proper spacing in the sequence of collations so that each collation in the sequence of collations is correctly assembled to the respective corresponding specific enclosure.

8 Claims, 7 Drawing Sheets

METHOD AND APPARATUS FOR KEEPING A MATCHED DOCUMENT INSERTER SYSTEM IN SYNCHRONIZATION

FIELD OF THE INVENTION

This invention relates to inserter systems which assemble documents into batches or collations for insertion into envelopes. More particularly, this invention is directed to control systems for such inserter systems.

BACKGROUND OF THE INVENTION

Inserter systems capable of generating over 10,000 mail pieces per hour are well known in the art and are generally used by organizations which produce a large volume of mailings where the contents of each mail piece varies. Often times, the inputs to the inserter system are computer generated and printed documents where each document contains information that is intended for a particular addressee. The documents may originate from a stack of cut sheets or from a web of forms. It is the function of the inserter system to accept the documents and produce the individual mailings that correspond to each document. To accomplish this, the typical inserter includes a variety of modules for performing different tasks on the documents passing through the inserter, such as: various web handling modules (slitters, cutters and bursters) for separating the continuous forms into singular or discrete documents, a sheet feeder module for feeding individual cut sheets, an accumulator module for assembling the sheets and/or form documents into a collation, a folder module for folding the collation into a desired configuration (Z-fold, C-fold, half fold), a conveyor/staging module for transporting and queuing the collation, a plurality of enclosure feeder modules for assembling and adding a packet of enclosures to the collation, an insert station module for inserting the collation into an envelope, and a control system to synchronize the operation of the overall inserter system to assure that the collations are properly assembled. Examples of such inserter systems are the 8 Series™ and 9 Series™ inserter systems available from Pitney Bowes, Inc., Stamford, Conn.

Typically, information for control of such inserter systems is read from a control document by a scanner associated with the most upstream module in the inserter system. The control document is generally an address bearing document and contains information that is specific to a particular addressee. Additionally, each control document contains control information for instructing the downstream modules as to how to assemble a particular mail piece. Once scanned, the control information is transmitted to the control system of the inserter system which monitors the processing of the collation through each module. Generally, the control document includes a barcode type control code, or other machine readable markings, which defines: the number of forms or sheets to be accumulated into the collation, the number of enclosures from each of the enclosure feeder modules to be assembled to the collation and information for other purposes such as the selection of appropriate postage.

The enclosures that are assembled to the collation at the enclosure feeder modules are of two types, either generic or specific. The generic enclosures (advertisements, notices, business return envelopes, etc.) are of a general type that are not specifically directed to any particular addressee. Therefore, generic enclosures serve each addressee equally well. On the other hand, specific enclosures (canceled checks, invoice statements, etc.) contain unique information that is directed to a particular addressee. This is commonly referred to in the industry as matched mailing. In this case, specific enclosures are only meaningful for the appropriate addressee and thus must be matched to each addressee.

An example of a mail piece containing specific enclosures that can be produced by an inserter system is a monthly checking account statement which includes a summary of all account activity (documents—input from the web or sheet feeder modules) and the canceled checks (specific enclosures—input from the enclosure feeder modules). Accordingly, the account summary and the canceled checks associated with the account must be matched together by the inserter system prior to insertion into the envelope.

Therefore, in matched mail applications, a high degree of synchronization must be incorporated into the inserter system for it to function properly. Continuing with the example from above, the canceled checks must be placed into the enclosure feeders in a known order. In similar fashion, the account summaries must be input into the insert system in a corresponding order. In a typical operation, the control document will contain the name, address and account number of a particular addressee. The control code on the control document will inform the inserter system of the number of subsequent following sheets/forms that are necessary to complete the account summary. In response, the inserter system will collect the control document and subsequent sheets/forms in the accumulator module to form a collation. Once completed, the collation advances to the folder module for folding into a desired configuration. After folding, the collation advances to the conveyor/staging module. At this point, the insert system instructs the enclosure feeder modules to feed and collect a packet of enclosures based on information contained in the control code. For example, the insert system may instruct a first enclosure feeder module to feed five (5) enclosures and a second enclosure feeder module to feed ten (10) enclosures. Next, the document collation is combined with the packet of enclosures to form a new collation which is fed downstream for further processing, such as insertion of the new collation into an envelope. Therefore, it is understood that without such a high degree of synchronization, or if something occurs to disturb the synchronization, that problems in producing proper matched mailings can result.

Such inserter systems, as described above, have proven generally effective in producing large numbers of matched mailings. However, they have suffered from the disadvantage of a rigid and inflexible control system that does not recover well from events which occur that disturb the synchronization between the control document collation and the enclosure feeder modules. One type of event that can disturb the synchronization is a jam. If a jam occurs, then the inserter system shuts down and operator intervention is required to correct the jam by removing the jammed collation. Sometimes, the jam occurs upstream from the enclosure feeder modules, for example in the folder module. In this case, the synchronization between the control document collation and the enclosure feeders has been lost because the enclosures associated with the jammed collation would still be in the enclosure feeder modules. Thus, if the inserter system is restarted, then the next collation after the jammed collation, which has been removed, that reaches the enclosure feeder modules would receive the enclosures that were supposed to be matched to the jammed collation and the appropriate enclosures would still be in the enclosure feeder modules. As a result, every control document following the jam would be out of synchronization with the enclosures.

In order to address this problem, current practice is to have the operator manually resynchronize the control documents with the enclosures. To accomplish this, the operator must use the jammed collation, which has been removed, to determine how many enclosures from each enclosure feeder module correspond to the jammed collation. This can be difficult since the control code that contains this information is in machine readable format and not human readable format. Once the operator determines this information, the operator must proceed to each enclosure feeder module to manually remove the correct number of enclosures. Although this procedure will resynchronize the inserter system, it is time consuming, requires a highly skilled operator and is susceptible to human error.

Another approach to generating proper matched mailings is disclosed in U.S. Pat. No. 4,733,359, issued on Mar. 22, 1988, entitled DOCUMENT COLLATING AND INSERTING SYSTEM HAVING DISPLAYS FOR DOCUMENT COUNT VERIFICATION and assigned to the assignee of the present invention. This system does not resynchronize an inserter after a jam, but does ensure that the collation (bank statement) receives the correct number of checks prior to insertion into an envelope. This system includes a video camera captures information printed on the bank statement indicative of the number of checks corresponding to that statement and a counter located at the check feeder for counting the number of checks that have been fed. The output of the video camera and the counter are displayed side-by-side so that an operator may compare them. If the two numbers are the same, then the operator allows further processing without interruption. However, if the two numbers are not the same, then the operator intervenes to correct the problem. Thus, this system requires that the operator monitor the inserter system during operation.

Therefore, there is a need for an intelligent and flexible control system that will recognize events that would disturb the synchronization and then automatically take corrective action to remedy the problem.

SUMMARY OF THE INVENTION

Accordingly, it is an object of the present invention to provide an intelligent and flexible control system that will recognize events that would disturb the synchronization in matched mail piece applications and then automatically take corrective action.

In accomplishing these and other objects there is provided a method and apparatus for keeping a matched document inserter system in synchronization. The method and apparatus are directed to controlling an inserter system which includes an input section for producing a sequence of collations, a transport for feeding the sequence of collations in a path of travel and a chassis section downstream from the input section capable of combining each collation in the sequence of collations with a respective corresponding specific enclosure. The method comprises the step(s) of: (a) recognizing when a collation in the sequence of collations has been removed from the inserter system, and (b) after the removed collation has been eliminated from the sequence of collations, maintaining proper spacing in the sequence of collations so that each collation in the sequence of collations is correctly assembled to the respective corresponding specific enclosure.

Therefore, it is now apparent that the invention achieves all the above objects and advantages. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention. As shown throughout the drawings, like reference numerals designate like or corresponding pads.

DETAILED DESCRIPTION OF THE PREFERRED EMBODIMENT

Figure 1:
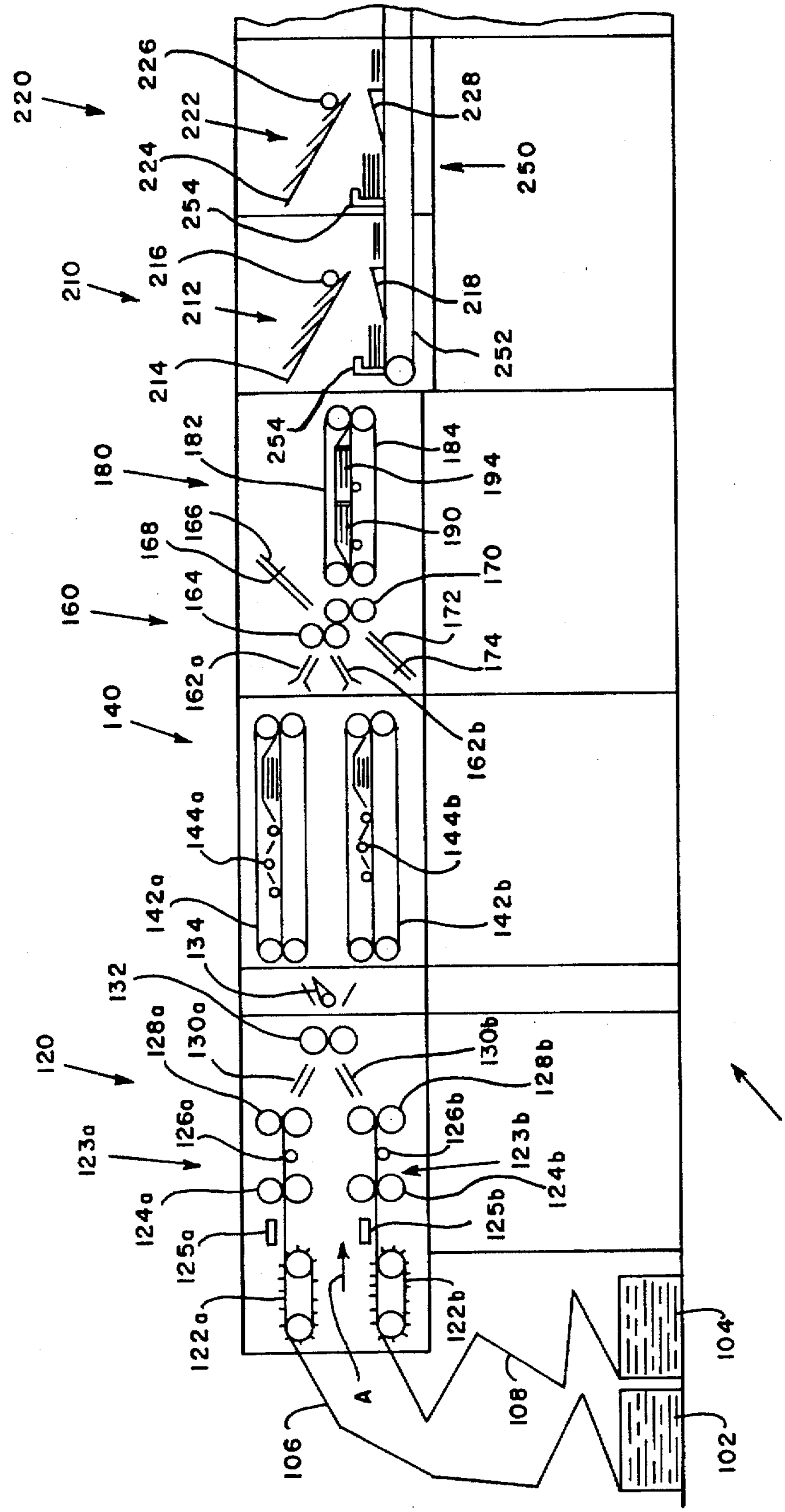
FIG. 1 a schematic elevational view of an inserter system in which the present invention may be employed.

Referring now to the drawings, and particularly to FIG. 1, there is shown in diagrammatic form a representative inserter system 100 for processing documents fed in a path of travel generally indicated by arrow "A". Typically, inserter systems of the type shown in FIG. 1 include an input section for assembling printed documents into a collation, a chassis section for assembling enclosures to the collation and stuffing the collation into an envelope, and an output section for further processing of the envelope, such as: sealing, weighing, applying postage, sorting and stacking. The input section of the inserter system 100 includes: a burster module 120, an accumulator module 140, a folder module 160 and a conveyor/staging module 180. The chassis section of the inserter system 100 is only partially shown and includes a first enclosure feeder module 210 and a second enclosure feeder module 220 and other suitable downstream modules for further processing the collation, such as: additional enclosure feeder modules, an envelope feeder module and an insert station module.

The collations are fed seriatim along a path and may or may not require matched enclosures. Furthermore, the collations may or may not require generic enclosures. Accordingly, the stream of collations may be of mixed varieties with some mail pieces having just specific enclosures, others having both specific and generic enclosures and still others having just generic enclosures.

The output section of the inserter system 100 is not shown as it has no bearing on the practice of the present invention. The mechanical construction and arrangement of the various modules that make up the inserter system are well known by those skilled in the art and depends upon the particular requirements of each installation. Since the exact instrumentalities by which each module performs its operations is not necessary for an understanding of the present invention, the discussion of the design details will be will be limited to that which is necessary for an understanding of the present invention. A more detailed description of an inserter system of the type in which the present invention may be employed is provided in U.S. Pat. No. 4,547,856, entitled UNIVERSAL MULTI-STATION DOCUMENT INSERTER, issued Oct. 15, 1985, assigned to the assignee of the present invention and hereby incorporated by reference.

The documents to be processed in the inserter 100 are initially in the form of webs 106 and 108 each containing a plurality of forms which are joined together at transverse lines of weakening or perforation lines. The webs 106 and 108 are normally stored in stacks 102 and 104, respectively, in a fan-fold configuration. The webs 106 and 108 may contain forms of the same or different sizes.

The webs 106 and 108 are first drawn into the burster module 120 which withdraws the webs 106 and 108 from the fan-fold stacks 102 and 104, respectively. The web 106 is advanced by feed assembly 122a past a scanner assembly 125a toward a bursting assembly 123a which separates the forms making up the web 106 into discrete documents or sheets. The feed assembly 122a, scanner assembly 125a and the bursting assembly 123a are all of well known construction. The feed assembly 122a includes a tractor drive having a sprocketed belt for engaging the sprocket holes on the lateral edges of the web 106. As the web 106 is fed to the bursting assembly 123a, the scanner assembly 125a scans a specialized form called a control document (not shown) for a control code (not shown). The control code is typically a barcode and provides instructions and other information to the inserter system 100 for assembling a mail piece corresponding to the control document. The bursting assembly 123a includes a pair of bursting rollers 124a, a bursting cone 126a and a pair of feeding rollers 128a. As is well known in the art, at the instant that a perforation line in the web 106 that separates two adjacent forms is over the burst cone 126a, the bursting rollers 124a are momentarily decelerated while the feeding rollers 128a continue to feed at a constant rate. This action produces a momentary tension on the web 106 and, with the assistance of the burst cone 126a, generates sufficient force to snap or burst the lead form of the web 106 from the upstream adjacent form. The web 108 is handled in analogous fashion by feed assembly 122b, scanner assembly 125b and bursting assembly 123b which includes a pair of bursting rollers 124b, a burst cone 126b and a pair of feeding rollers 128b.

The discrete documents from the webs 106 and 108 are then fed between suitable guides 130a and 130b which direct them to a single pair of feed rollers 132 and past a movable deflector 134 to the accumulator module 140. The accumulator module 140 includes an upper and lower transport assembly 142a and 142b, respectively, for stacking a plurality of documents on top of each other. The deflector 134 actuates between two positions so as to direct the documents separated from the webs 106 and 108 to either the upper transport assembly 142a or lower transport assembly 142b. The upper transport assembly 142a includes an adjustable stacking device 144a while the lower transport assembly 142b includes an adjustable stacking device 144b.

In operation, documents from the webs 106 and 108 are feed in alternating fashion between the upper transport assembly 142a and the lower transport assembly 142b. For example, to assemble a first collation, a first control document from web 106 is scanned and provides the insert system 100 with information about the number of following forms from web 106 that belong with the first control document, in this example three (3) forms. Thus, with the deflector 134 positioned as shown, the first control document and the following three forms are sequentially fed, burst and directed into upper transport assembly 142a to assemble the first collation containing four (4) documents (the control document and the following three forms). Next, to assemble a second collation, the web 108, containing a second control document having a barcode thereon, is advanced by the burster assembly 120. Again, the barcode provides the insert system 100 with information of the number of following forms from web 108 that belong with the second control document, in this example two (2) forms. Thus, the deflector 134 must be repositioned so that after the second control document and the following two forms are sequentially fed and burst, they are directed into lower transport assembly 142b to assemble the second collation containing three (3) documents (the control document and the following two forms). In this manner, collations are sequentially and alternately assembled in the upper and lower transport assemblies 142a and 142b so as to increase overall system throughput.

Once a collation has been assembled in the accumulator module 140, it is fed into the folder module 160 which is capable of accepting collations from either of the upper or lower transport assemblies 142a and 142b from guides 162a and 162b, respectively. The folder module 160 includes a first pair of folding rollers 164, a first buckle chute 166 having an adjustable end stop 168, a second pair of folding rollers 170 and a second buckle chute 172 having an adjustable end stop 174. The end stops 172 and 174 are repositionable along the length of the buckle chutes 166 and 172, respectively, depending upon the desired fold configuration. The collations are fed into the first buckle chute 166 until the lead edge of the collation abuts the end stop 168. When this happens, a buckle forms in the collation between the lower roller of pair 164 and the upper roller of pair 170. As the collation continues to feed, the buckle continues to form and is forced between the nip of these rollers. These rollers crease the collation and, as a result, the crease now becomes the new leading edge of the partially folded collation. This lead edge is next directed to the second buckle chute 172 until the lead edge abuts an end stop 174 and a new buckle forms next to the nip between the second pair of folding rollers 170. When this happens, another crease is formed as the collation is forced between the nip of these rollers. Thus, the collation is folded twice. However, those skilled in the art will recognized that the setup of the folder module 160 may be reconfigured to achieve different fold configurations by adjusting the position of the end stops 168 and 174. Furthermore, the buckle shoots 166 and 172 may be bypassed all together by placing diverters in the feed path of the collation.

As the collation exits the second pair of folding rollers 170 of the folding module 160, the collation is fed into the conveyor/staging module 180. The conveyor/staging module 180 includes an upper O-ring transport assembly 182, a lower O-ring transport assembly 184, and a plurality of solenoid actuated stop assemblies 190 and 194. Each stop assembly 190 and 194 is selectively and independently operable to both stop and allow feeding of the collation. To stop feeding the collation, each stop assembly 190 and 194 includes a collation obstructing surface that is positionable in the feed path of the collation to prevent further downstream travel as the O-rings slip past the collation. On the other hand, to allow feeding the collation, the obstructing surface is repositioned out of the feed path so that the O-rings carry the collation downstream.

As the collation is fed from the conveyor/staging module 180, the collation drops onto the feed deck of the chassis section of the inserter system 100. The first enclosure feeder module 210 includes a stack 212 of enclosures loaded into a feed tray 214 and an enclosure feed assembly 216 for delivering the enclosures in seriatim onto the feed deck and into the path of travel. Additionally, the feeder module 210 includes a ramp 218 which will be discussed in more detail below. Similarly, the second enclosure feeder module 210 includes a ramp 228, a stack 222 of enclosures loaded into a feed tray 224 and an enclosure feed assembly 226 for delivering the enclosures in seriatim onto the feed deck and into the path of travel. Thus, the second enclosure feeder module 220 is substantially similar to the first enclosure feeder module 210. However, in matched mail and other applications, the enclosures in stack 212 and stack 222 will not be identically the same. Those skilled in the art will recognize that any number of enclosure feeder modules can be incorporated into the chassis section. Furthermore, some of the enclosure feeder modules may contain matched or specific enclosures while other enclosure feeder modules may contain generic enclosures.

Running the length of the enclosure feeder modules 210 and 220 is a transport assembly 250 including an endless chain 252 having a plurality of pusher fingers 254 attached thereon. The endless chain 252 is located below the feed deck while the pusher fingers 254 rise and fall below the feed deck as the chain 252 advances. The pusher fingers 254 work in cooperation with the ramps 218 and 228 to assemble the collation to the enclosures so as to form a new collation. The enclosure feed assemblies 216 and 226 deliver the appropriate number of enclosures onto the feed deck of the chassis section downstream from the ramps 218 and 228, respectively. As the pusher fingers 254 advance, the collation is fed up and over ramp 218 landing on top of the waiting enclosures that were fed down from enclosure feed assembly 216. Then, this new collation is fed downstream together by the pusher fingers 254 toward the second enclosure feeder module 220 where the above sequence of events are repeated. The pusher fingers 254 fed the collation, containing both folded documents and enclosures from the first enclosure feeder module 210 up and over ramp 228 landing on top of the waiting enclosures that were fed down from enclosure feed assembly 226. Then, this new collation is fed downstream by the pusher fingers 254 for further processing.

After passing through the enclosure feeder modules 210 and 220, the collation will proceed to further downstream modules, such as: more enclosure feeder modules and an insert station module where the final collation is stuffed into an envelope. Then, the envelope is fed into the output section of the inserter system 100. Those skilled in the art will recognized that it is possible to have further downstream modules and various combinations for these modules. However, the exact arrangement of these modules has no bearing on the practice of the present invention.

Figure 2:
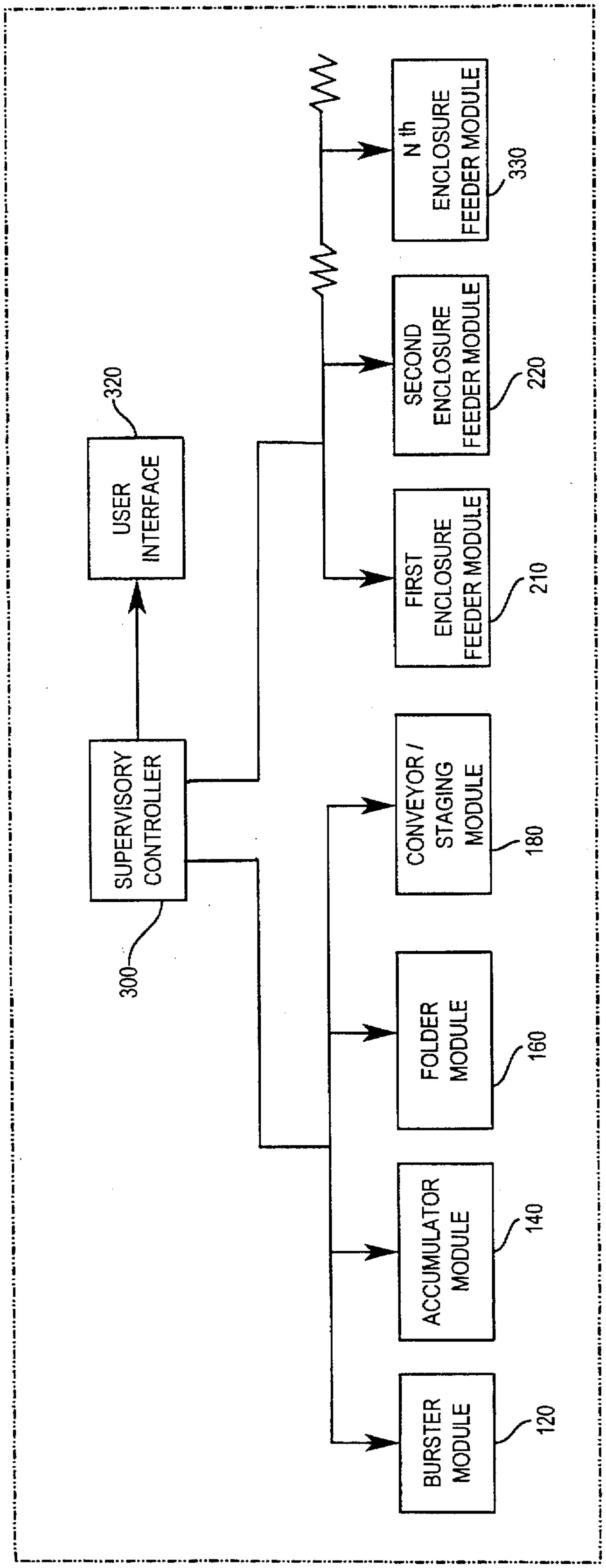
FIG. 2 a block diagram which represents the communication network of the inserter system of FIG. 1.

From the above description, it should be apparent that the operations of the various modules of the inserter system 100 require a high degree of coordination so as to correctly produce matched mailings. Referring to FIG. 2, a block diagram is shown which represents the communication network of the inserter system 100. A supervisory controller 300 is in communication with a user interface 320, the input section (burster, accumulator, folder, conveyor/staging), and the chassis section (first enclosure feeder 210, second enclosure feeder 220, Nth enclosure feeder 330, etc.) of the inserter system 100. The supervisory controller 300 represents both a high level machine control system that is independent of the exact configuration of the inserter system 100 and a low level machine control system that is dependent on the exact configuration of the inserter system 100. The supervisory controller 300 includes suitably designed memory, microprocessors and software programs to carry out its functions. The supervisory controller 300 commands and coordinates the interactions among the various modules by monitoring the progress of the collations through the inserter system 100 and by providing instructions to the various modules as needed. Additionally, the supervisory controller 300 receives inputs from an operator through the user interface 320. These inputs may be of varying types, but are typically focused on job setup information for the inserter system 100.

The supervisory controller 300 is a hybrid hardware and software system the exact implementation of which is a matter of design choice. A more detailed description of the architecture of the supervisory controller 300 is provided in: U.S. Pat. No. 4,527,790, entitled APPARATUS AND METHOD FOR SEPARATING MULTIPLE WEBS OF DOCUMENTS HAVING THE CAPABILITY FOR ORDERLY SHUT-DOWN AND RE-START 0F OPERATION, issued Jul. 9, 1985; and U.S. Pat. No. 4,527,468, entitled APPARATUS FOR SEPARATING MULTIPLE WEBS OF DOCUMENTS INTO DISCRETE DOCUMENTS AND FORMING THE DISCRETE DOCUMENTS INTO PREDETERMINED BATCHES, issued Jul. 9, 1985, both of which are assigned to the assignee of the present invention and hereby incorporated by reference. Additionally, U.S. patent application Ser. No. 036,134, entitled SYSTEM AND METHOD FOR TWO LEVEL REAL-TIME CONTROL OF AN INSERTING MACHINE issued on Sep. 5, 1995 as U.S. Pat. No. 5,448,490 and U.S. patent application Ser. No. 232,542, entitled OPEN STATION ARCHITECTURE FOR AN INSERTER SYSTEM, issued on Feb. 11, 1997 as U.S. Pat. No. 5,603,059 both of which are assigned to the assignee of the present invention provide further detailed discussion of the supervisory controller 300 and are also hereby incorporated by reference.

Figure 3A:
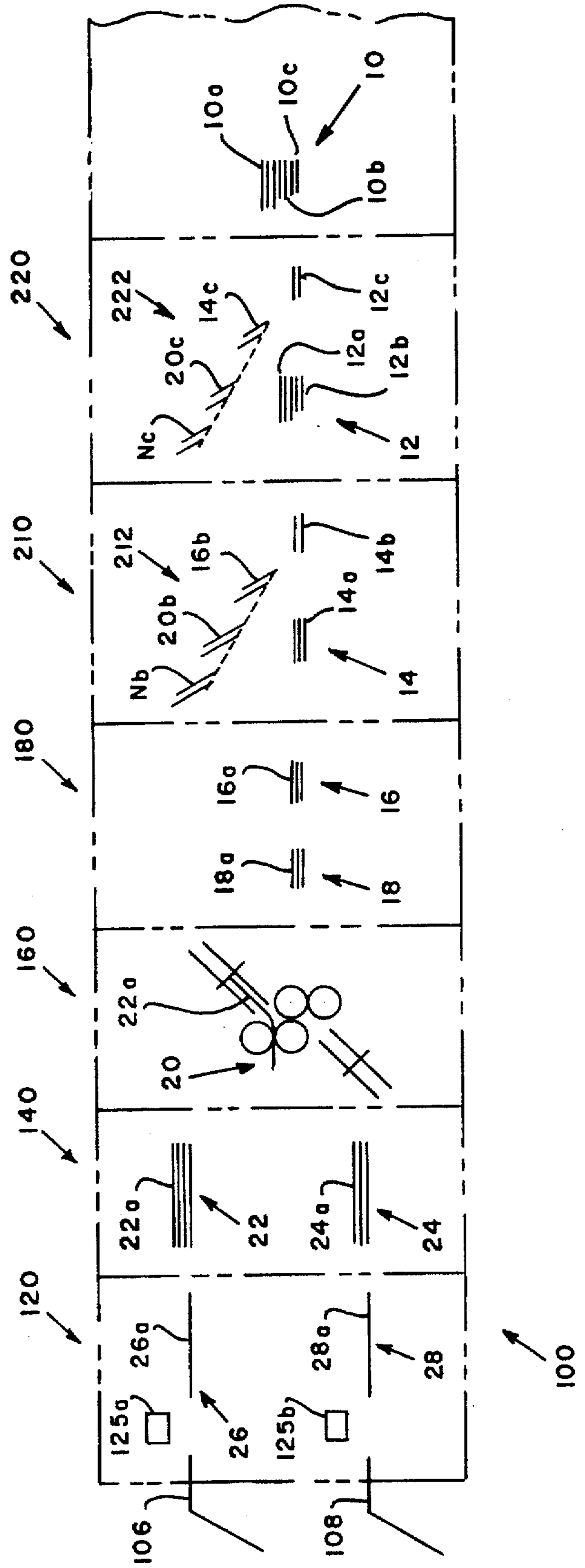
FIGS. 3A, 3B, 3C, 3D and 3E are diagrammatic views of the inserter system of FIG. 1 having a plurality of collations in various stages of completion.

Referring to FIG. 3A, a diagrammatic view of inserter system 100 is shown where a plurality of collations 10, 12, 14, 16, 18, 20, 22, 24, 26 and 28 are in various stages of completion. Collation 10 has been assembled in accordance with the description provided above and includes portions **10*a*, 10*b* and 10*c*; where portion 10*a* is from either web 106 or web 108, portion 10*b* is from first enclosure feeder module 210 and portion 10*c* is from second enclosure feeder module 220. For all the collations 10, 12, 14, 16, 18, 20, 22, 24, 26, 28 and up to the Nth collation, portions with an "a" subset have been made from the webs 106 and 108, portions with a "b" subset have been supplied from the first enclosure feeder module 210 and portions with a "c" subset have been supplied from the second enclosure feeder module 220. Collation 12 includes portions 12*a* and 12*b* while portion 12*c*, which is waiting on the feed deck in the second enclosure feeder module 220, has yet to be assembled. Collation 14 only includes portion 14*a*. Portion 14*b* has yet to be assembled to collation 14 and is waiting on the feed deck in the first enclosure feeder module 210. Portion 14*c* is located in the second enclosure feeder stack 222 and is ready to be fed onto the feed deck. Collation 16 is in the last position of the conveyor/staging module 180 and only includes portion 16*a*. Portion 16*b* has yet to be assembled to collation 16 and is located in the first enclosure feeder stack 212 ready to be feed onto the feed deck. Portion 16*c* (not shown) is located in the second enclosure feeder stack 222 next in sequence behind portion 14*c***. The remaining collations are in various stages of completion as illustrated.

In this configuration, both the first and second enclosure feeder modules 210 and 220 are supplying matched enclosures. Therefore, those skilled in the art will recognize that while the input section of the inserter system 100 is building the "a" portion of the collations while the associated "b" and "c" portions are already loaded into the first enclosure feeder module 210 and second enclosure feeder module 220, respectively, in sequential order. Additionally, it should be noted that the "a" portion may include one or more sheets and the "b" and "c" portions may each include zero, one or more enclosures. The number of sheets and enclosures from each of the enclosure feeder modules 210 and 220 is determined from the information contained in the control code.

It should now be apparent that if a jam occurs in the input section, then the synchronization between the "a" portions and the "b" and "c" portions will be lost. Prior art solutions to this problem, as described above, require the operator to manually remove the enclosures from each matched enclosure feeder that are associated with the jammed collation. This manual resynchronization takes time and a highly skilled operator.

Figure 4:
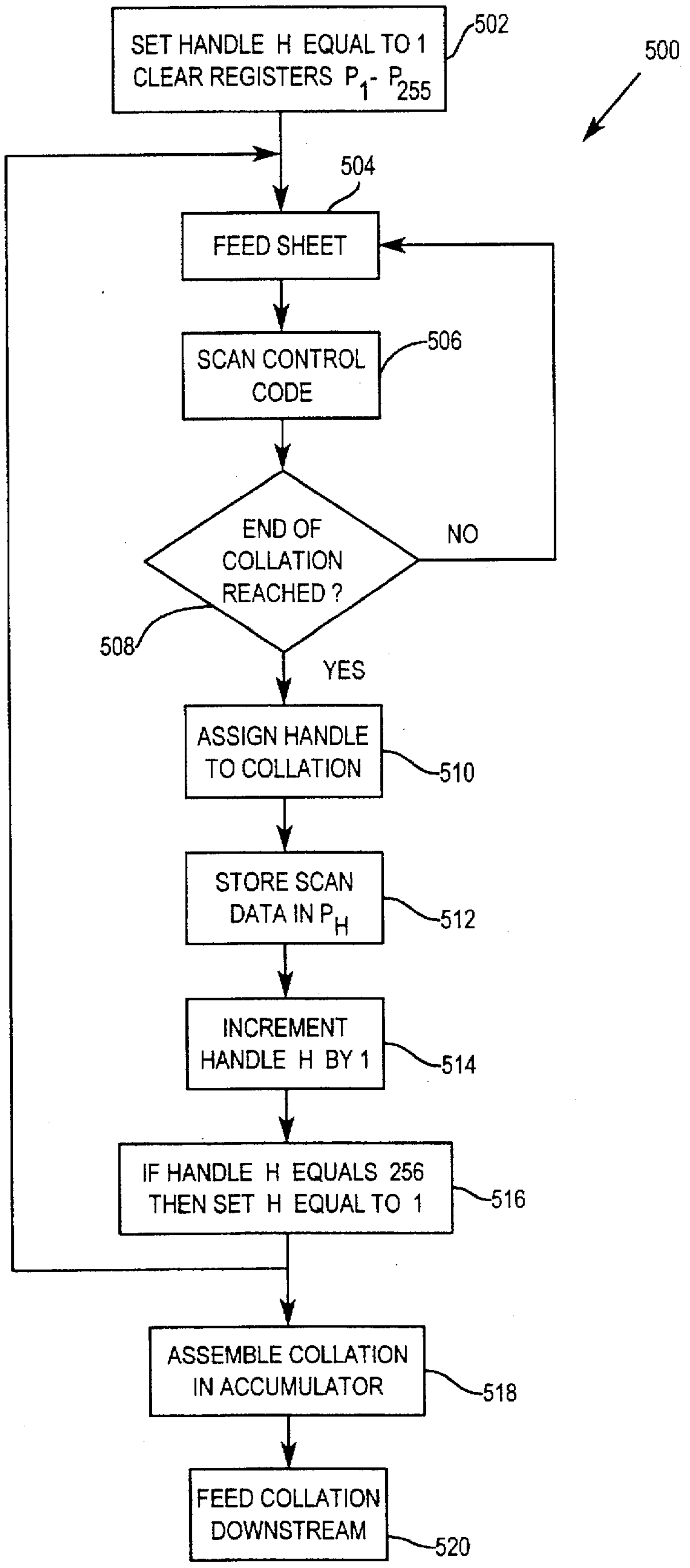
FIG. 4 is a flow chart of a handle assigning routine in accordance with the present invention.

In contrast, the present invention contemplates an apparatus and method for automatically resynchronizing or keeping the inserter system 100 in sync. To accomplish this, the present invention utilizes a handle routine 500, a fault routine 600 and a feed chassis routine 700. Referring to FIG. 4, the routine 500 under the control of the supervisory controller 300 is shown which assigns handles (sequential identification codes) to the collations in the input section and stores the control information scanned from each control document with its respective handle. During inserter system 100 initialization, at 502, a handle variable H is set equal to one and a plurality of data holding registers (commonly referred to as an array) $P_1$ to $P_{255}$ are cleared. To begin assembling mail pieces, at 504, the burster module 120 is instructed to feed from either web 106 or web 108. At 506, the control code on the first control document is scanned. As described above, the control code contains data including information and instructions necessary to assemble each respective collation. Therefore, the scan data will include the number of following forms that are necessary to complete the "a" portion of the collation as well as the number of enclosures that must be fed from the first and second enclosure feeder modules 210 and 220, respectively, to generate the associated "b" and "c" portions of the collation. Other information may also be included in the scan data. At 508, a determination is made as to whether the last sheet in the first collation has been fed. If not, then the handle routine 500 returns back to 504 and the burster module is instructed to feed another sheet from the respective web 106 or 108. Thus, it is apparent that the handle routine 500 loops in this fashion until the end of the first collation is reached. Once the end of the first collation is reached, then the routine 500 moves from 508 to 510 where the current value (one) of the handle H is assigned to the first collation. Next at 512, the scan data from the first control document associated with the first collation is stored in register $P_H$. Since H equals one, the scan data for the first collation is stored in $P_1$. Then, at 514, the value of H is incremented by one. At 516, if H equal 256, then the value of H is reset to one. Next, a branch occurs where the handle routine 500 returns to block 504 to begin processing a second collation and also proceeds to block 518 to continue processing the first collation. At 518, the first collation is assembled in the accumulator module 120 and then, at 520, feed downstream for further processing, such as folding.

It should now be understood that handle routine 500 continuously loops between blocks 504 and 516 so that each collation receives a respective handle H which serves as a unique identifier that can be used by the supervisory controller 300 to monitor the progress of each collation through the various modules of the inserter system 100.

Figure 5:
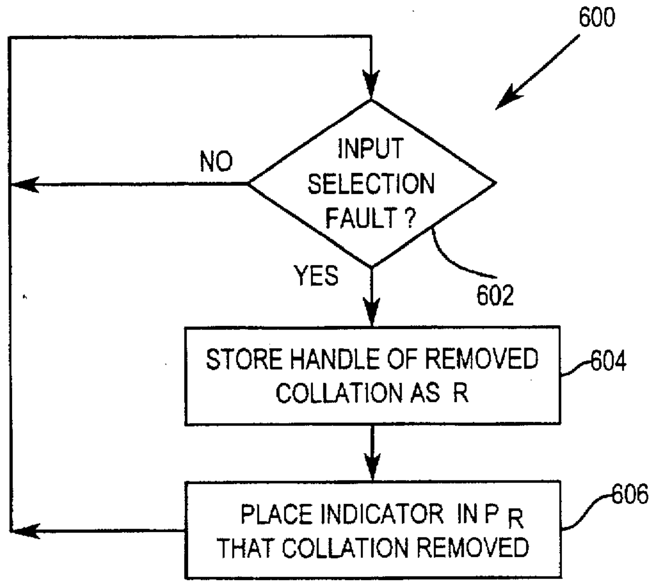
FIG. 5 a flow chart of a fault detecting routine in accordance with the present invention.

Referring to FIG. 5, the fault routine 600, also under the control of the supervisory controller 300 and running concurrently with the handle routine 500, is shown. At 602, a determination is made whether a fault, such as a jam, has occurred in the input section of the inserter system 100. A fault condition is one where a collation is removed from the inserter system 100, typically by the operator. If a fault does not occur, then the fault routine 600 takes no action and merely loops back to 602 to continue monitoring for faults. On the other hand, if a fault does occur, then at 604, a removed collation variable R is set equal to the handle of the removed collation. Next, at 606, an indicator is placed with the scan data in register $P_R$ to indicate that this collation has been removed. Then, the fault routine 600 loops back to 602 to continue monitoring for faults. Additionally, the scan data in register $P_R$ may be copied to another file so that at a later point in time a report may be generated indicating those collations that have been removed. Thus providing the customer will added capability to reconcile the integrity of the batch of mailings.

Figure 6:
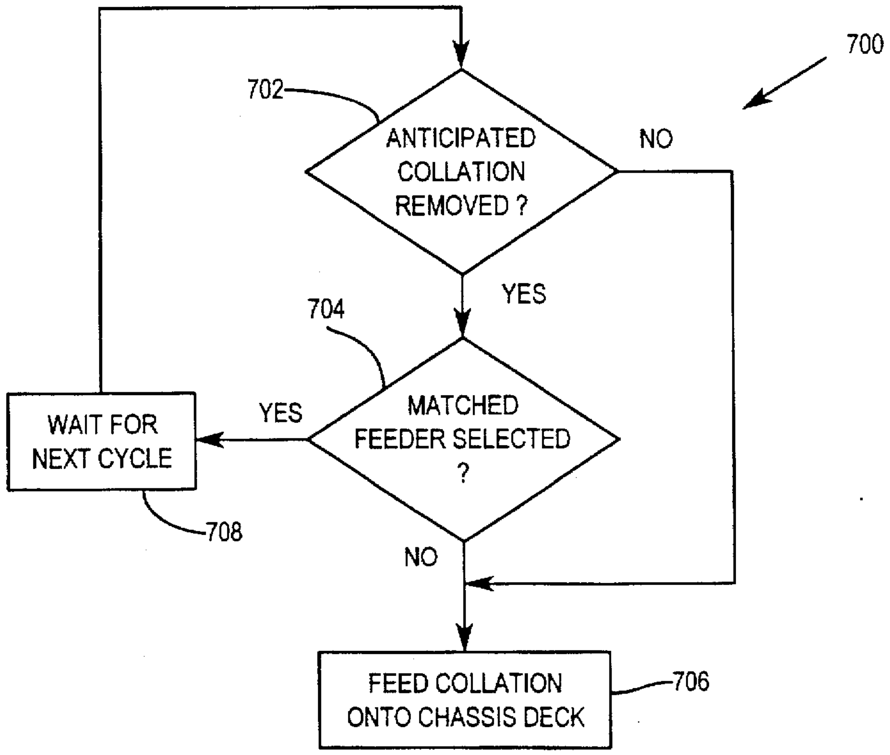
FIG. 6 a flow chart of a chassis feed routine in accordance with the present invention.

Referring to FIG. 6, the feed chassis routine 700, also under the control of the supervisory controller 300 and running concurrently with the handle routine 500 and fault routine 600, is shown. The feed chassis routine 700 coordinates the transfer of the collations from the input section to the chassis section of the inserter system 100. Thus, its primary function is to control feeding of the collations from the last position in the conveyor/staging module 180 onto the chassis feed deck. Because the supervisory controller 300 monitors the progress of the collations throughout the entire inserter system 100, the chassis section "knows" the sequence and handle of the collation that should be fed next by the input section.

Thus, before the collation is fed onto the feed deck, a determination is made, at 702, whether the anticipated collation has been removed. This is accomplished by checking the appropriate register $P_H$ corresponding to the handle of the anticipated collation to see if the collation removed indicator is present. If the anticipated collation has not been removed (it is present), then the feed chassis routine 700 proceeds to 706 and the conveyor/staging module 180 is instructed to feed the collation onto the chassis feed deck and processing continues normally. The pusher fingers 254 take over control of the collation and transport it downstream. On the other hand, if the collation has been removed, then, at 704, a determination is made whether a matched enclosure feeder module has been selected for this removed collation. This is also accomplished by checking the appropriate register $P_R$ corresponding to the handle of the removed collation to see if the scan data indicates that matched enclosures were to be assembled to this collation. If no matched enclosures were selected, then, at 706, the conveyor/staging module 180 is instructed to feed the next available collation onto the chassis feed deck and processing continues normally. Thus, no mail piece for the removed collation that does not include matched enclosures is produced by the inserter system 100. On the other hand, if at 704 a matched enclosure feeder module has been selected for the removed collation, then the feed chassis routine 700 proceeds to 708 where the conveyor/staging module 180 is not instructed to feed the next available collation onto the chassis deck and instead the conveyor/staging module 180 is instructed to wait until the next feed opportunity or cycle.

Thus, a blank space representing the position that the removed collation would have been in is maintained in the pusher fingers 254. Then, the routine loops back to 702 for the next feed cycle and subsequent anticipated collation.

Referring to FIGS. 3A, 3B, 3C, 3D and 3E, a sequence of diagrammatic views of inserter system 100 are shown to illustrate the operation of the present invention. A plurality of collations 10, 12, 14, 16, 18, 20, 22, 24, 26, 28, 30, 32, 34, 36 and 38, with their respective portions "a", "b", and "c", are shown in various stages of completion. Handle routine 500 has already assigned handles to each of the collations 10, 12, 14, 16, 18, 20, 22, 24, 26, 28, 30, 32, 34, 36 and 38. FIG. 3A represents a snap shot in time before a fault has occurred while FIGS. 3B, 3C, 3D and 3E represent snap shots in time after a fault has occurred and where portion **20*a* has been removed. However, the portions 20*b* and 20*c* having matched enclosures that are specific to portion 20*a* are still in the inserter system 100. It should be noted that to resynchronize prior art systems, the operator would have to scuffle through the enclosure feed trays 214 and 224 (not shown) to locate and remove the portions 20*b* and 20*c* from stacks 212 and 222, respectively, before restarting the prior art system. The operational result and advantages of the present invention in keeping the inserter system 100** in synchronization can be understood from a study of these figures.

Figure 3B:
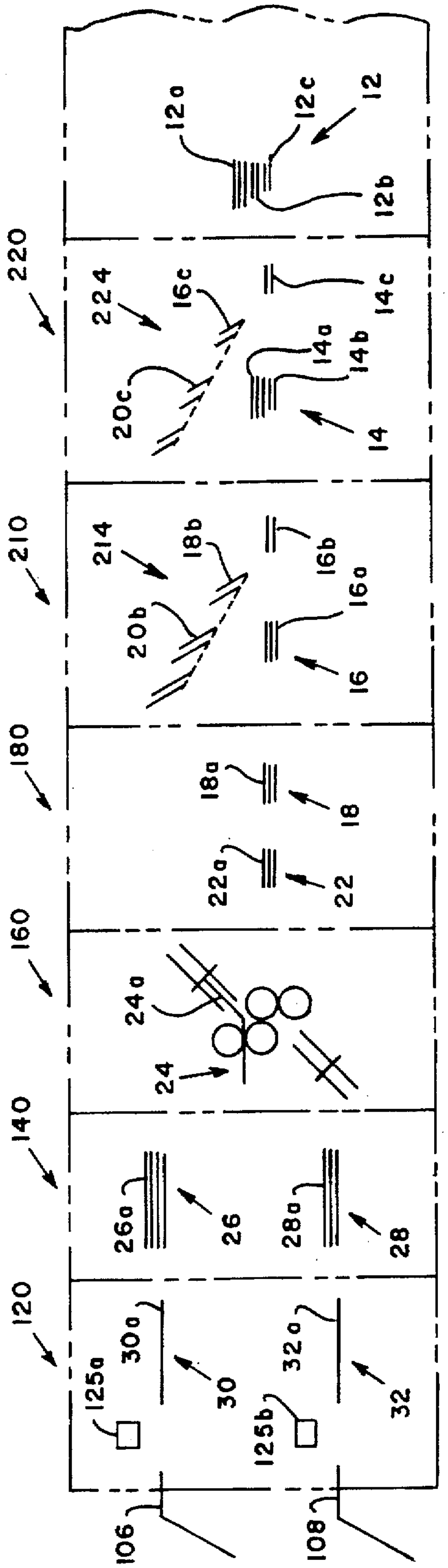

Referring to FIG. 3B, the portion **20*a* is no longer present as it has been removed from the stream of collations. Sophisticated inserter systems 100 will be able to determine which collation has been removed without assistance from the operator since each collation is tracked and monitored as it progresses from module to module. In other, less sophisticated systems, it may be necessary to have the operator input which collation has been removed. Fault routine 600 recognizes that collation 20 having portion 20*a* has been removed and has placed an indicator to that effect in the appropriate register $P_R$. Following restart of the inserter system 100, collations 18 and 22, having portions 18*a* and 22*a*, respectively, occupy adjacent positions in the insert section. Collations 10, 12, 14, 16 and 18 continue to process normally through the inserter system 100** as no faults have occurred with these collations.

Figure 3C:
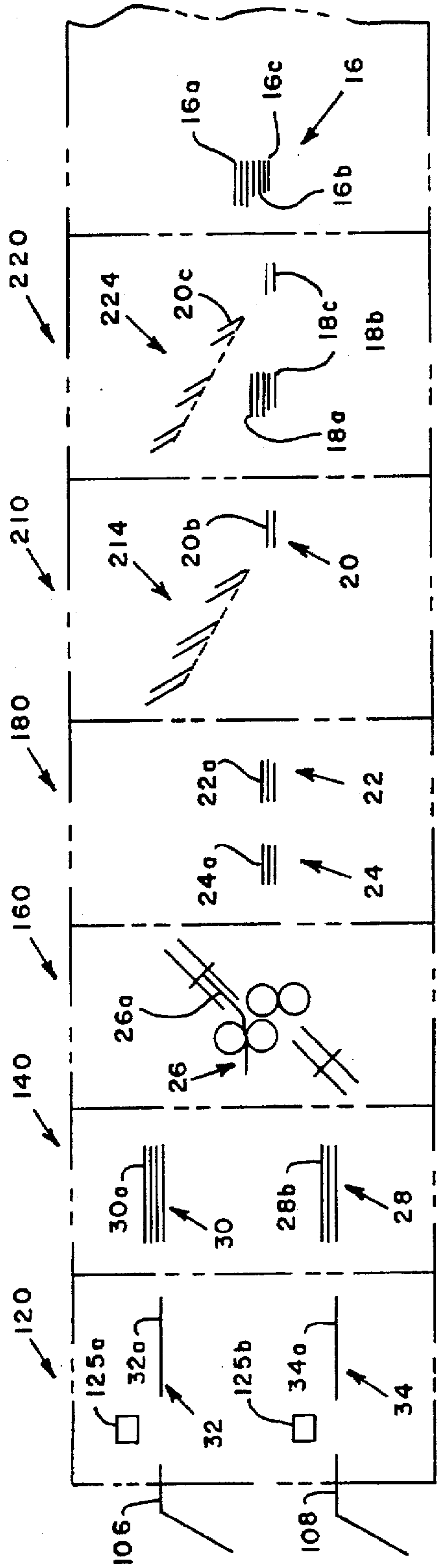

Referring to FIG. 3C, however, after collation 18 has been transferred from the input section to the chassis section, the next collation that the chassis section anticipates is collation 20. But, collation 20 has been removed and collation 22 is in the last position of the conveyor/staging module 180 in the input section. Thus, feed chassis routine 700 causes the conveyor/staging module 180 not to feed collation 22 onto the feed deck with the result that a blank position is established in the pusher fingers 254. However, the enclosures that make up portion **20*b* are still fed onto the deck at the first enclosure feeder module 210 while collation 18 is in process at the second enclosure feeder module 220. Thus, collation 20 is, in essence, re-established but without the mission portion 20*a***.

Figure 3D:
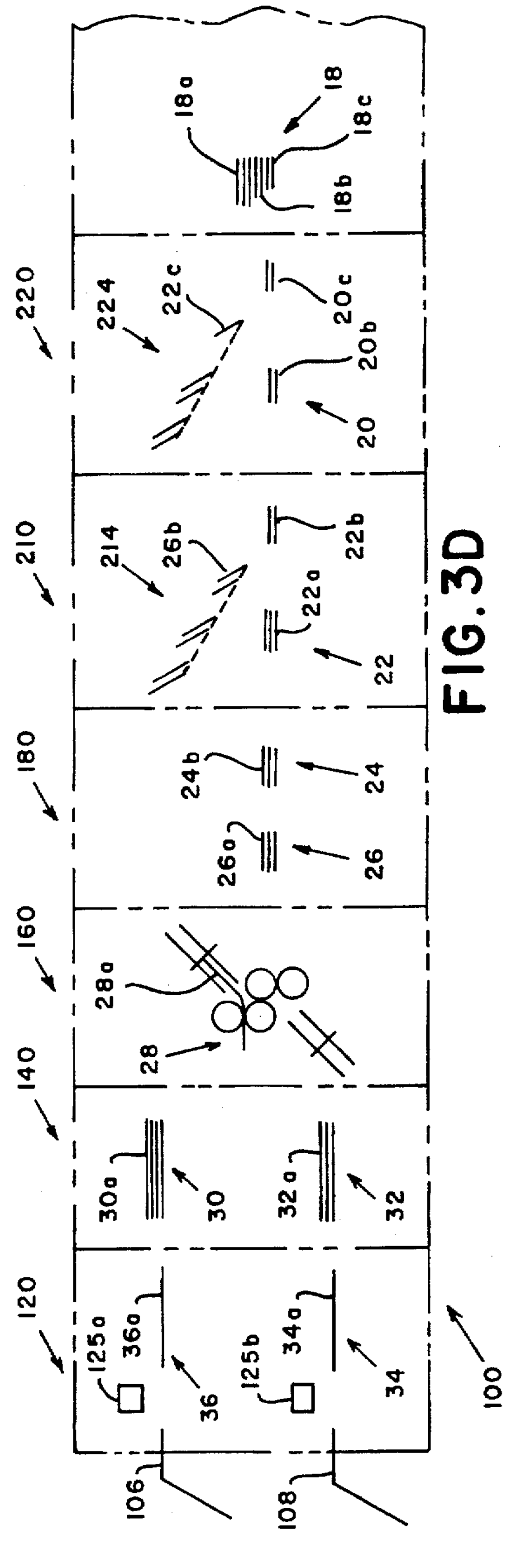
Figure 3E:
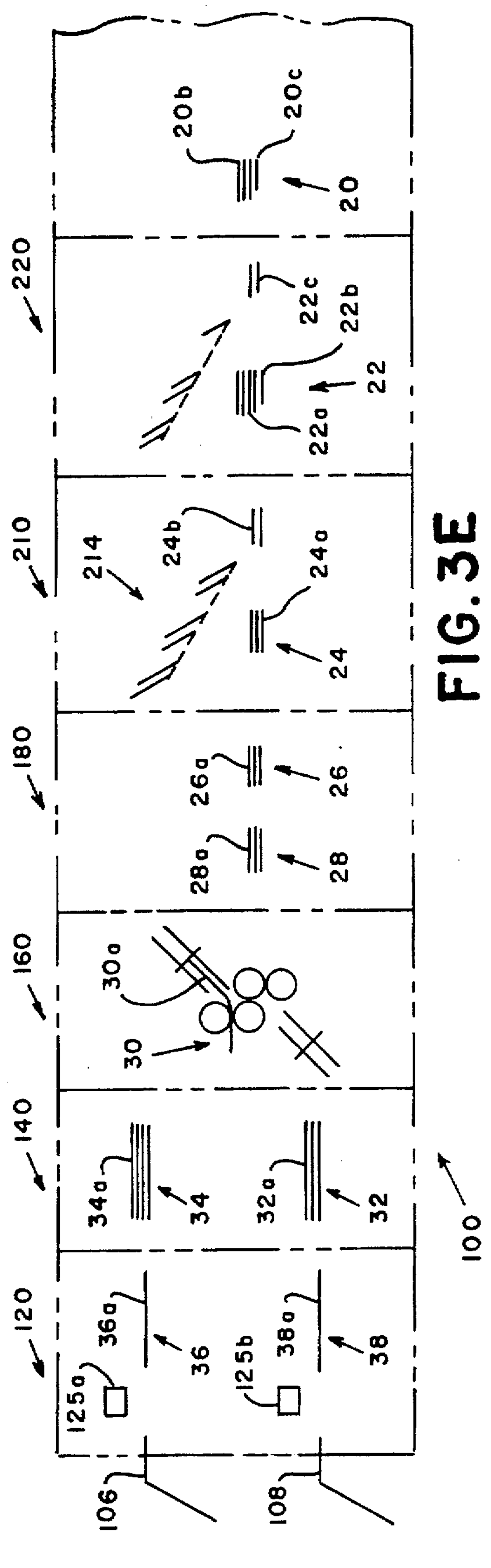

Referring to FIGS. 3D and 3E, the pusher fingers 254 advance portion **20*b* to the second enclosure feeder module 220 where the enclosures that make up portion 20*c* have been fed onto the deck. Then, as the pusher fingers 254 advance, portion 20*b* is assembled to portion 20*c* and together they are fed downstream for further processing. Portions 20*b* and 20*c* may then be diverted out of the normal feed path, such as before insertion into an envelope, or allowed to continue processing normally. Portion 20*a*, which has been removed, may be salvaged or recreated and then added to portions 20*b* and 20*c* off-line from inserter system 100 so as to properly complete this matched mail piece. It should be noted that collations 22, 24, 26, 28, 30, 32, 34, 36 and 38** have all continued to process normally.

It should now be apparent that the present invention resynchronizes or keeps the inserter system 100 in sync without the need for operator intervention at the first and second enclosure feeder modules 210 and 220. Thus, the inserter system 100 may be restarted more quickly following a jam and the level of skill necessary to operate the inserter system 100 is reduced. These features are highly desirable to large volume mailing operations in helping to keep operating expenses down.

Many features of the preferred embodiment represent design choices selected to best exploit the inventive concept as implemented in an inserter system having multiple matched enclosure feeder modules. However, the present invention is applicable to configurations have one or more matched enclosure feeder modules. Moreover, additional advantages and modifications will readily occur to those skilled in the art. For example, it would have been possible to create the blank space for the removed collation in the inserter section instead of waiting until the chassis section. However, for throughput and ease of implementation considerations a determination was made to wait until the chassis section. Also, the matched enclosure feeder modules are shown adjacent to the input section but their exact position in the chassis section is optional. For example, the generic enclosure feeder modules could be located adjacent to the input section with the matched enclosure feeder modules further downstream. Furthermore, the present invention will work equally well with cut sheet feeder modules or a cutter module instead of the burster module. Accordingly, those skilled in the art will recognized other various modifications which may be made without departing from the spirit of the general inventive concept as defined by the appended claims and their equivalents. Therefore, the invention in its broader aspects is not limited to the specific details of the preferred embodiment.

What is claimed is:

1. A control system for monitoring and coordinating the processing of a sequence of collations through an inserter system, the inserter system including an input section for producing the sequence of collations, transport means for feeding the sequence of collations in a path of travel and a chassis section downstream from the input section capable of combining each collation in the sequence of collations with a given number of respective corresponding specific enclosures, the control system comprising:

means for determining for each collation in the sequence of collations a number of respective corresponding specific enclosures;

means for recognizing when a collation in the sequence of collations has been removed from the inserter system; and supervisory control means for maintaining proper spacing in the sequence of collations, after the removed collation has been eliminated from the sequence of collations, so that each collation in the sequence of collations is correctly assembled to the respective corresponding specific enclosures by: (i) if the number of respective corresponding specific enclosures for the removed collation is greater than 0, maintaining a space in the sequence of collations corresponding to the removed collation and feeding the number of respective corresponding specific enclosures into the space; and (ii) if the number of respective corresponding specific enclosures for the removed collation is 0, eliminating the space in the sequence of collations associated with the removed collation.

2. The control system of claim 1, wherein said supervisory control means includes a memory and is further for:

assigning a unique handle to each collation;

establishing a revolving buffer having a plurality of registers located in said memory; and storing an indicator in a register corresponding to the removed collation denoting that the removed collation has been eliminated from the sequence of collations.

3. The control system of claim 2, wherein said supervisory control means is further for:

reading a control code located on a control document for each collation wherein the control code contains information indicative of the number of respective corresponding specific enclosures to be combined with each collation;

storing in each of the registers the number of respective corresponding specific enclosures for each collation; and after the removed collation has been eliminated from the sequence of collations, reading the register corresponding to the removed collation to determine whether the number of respective corresponding specific enclosures for the removed collation is greater than 0.

4. The control system of claim 3, wherein said supervisory control means is further for:

reading the register corresponding to an anticipated collation to be fed from the input section to the chassis section to determine if the anticipated collation is present;

if the anticipated collation is not present, reading the register corresponding to an anticipated collation to be fed from the input section to the chassis section to determine the number of respective corresponding specific enclosures for the anticipated collation is greater than 0; and in the chassis section, maintaining a space in the sequence of collations corresponding to the anticipated collation or eliminating the space in the sequence of collations associated with the anticipated collation depending upon the number of respective corresponding specific enclosures for the anticipated collation.

5. A method of controlling an inserter system including input section means for producing a sequence of collations, transport means for feeding the sequence of collations in a path of travel and chassis section means downstream from the input section means capable of combining each collation in the sequence of collations with a respective corresponding specific enclosure, the method comprising the step(s) of:

determining for each collation in the sequence of collations a number of respective corresponding specific enclosures;

recognizing when a collation in the sequence of collations has been removed from the inserter system; and after the removed collation has been eliminated from the sequence of collations, maintaining proper spacing in the sequence of collations so that each collation in the sequence of collations is correctly assembled to said respective corresponding specific enclosures by: (i) if the number of respective corresponding specific enclosures for the removed collation is greater than 0, maintaining a space in the sequence of collations corresponding to the removed collation and feeding the number of respective corresponding specific enclosures into the space; and (ii) if the number of respective corresponding specific enclosures for the removed collation is 0, eliminating the space in the sequence of collations associated with the removed collation.

6. The method of claim 5, further comprising the step(s) of:

assigning a unique handle to each collation;

establishing a revolving buffer having a plurality of registers located in a memory; and storing an indicator in a register corresponding to the removed collation denoting that the removed collation has been eliminated from the sequence of collations.

7. The method of claim 6, further comprising the step(s) of:

reading a control code located on a control document for each collation wherein the control code contains information indicative of the number of respective corresponding specific enclosures to be combined with each collation;

storing in each of the registers the number of respective corresponding specific enclosures for each collation; and after the removed collation has been eliminated from the sequence of collations, reading the register corresponding to the removed collation to determine whether the removed collation has a corresponding specific enclosure.

8. The method of claim 7, further comprising the step(s) of:

reading the register corresponding to an anticipated collation to be fed from the input section to the chassis section to determine if the anticipated collation is present;

if the anticipated collation is not present, reading the register corresponding to an anticipated collation to be fed from the input section to the chassis section to determine the number of respective corresponding specific enclosures for the anticipated collation is greater than 0; and in the chassis section, maintaining a space in the sequence of collations corresponding to the anticipated collation or eliminating the space in the sequence of collations associated with the anticipated collation depending upon the number of respective corresponding specific enclosures for the anticipated collation.

* * * * *